United States Patent [19]
Ochs et al.

[11] Patent Number: 5,551,251
[45] Date of Patent: Sep. 3, 1996

[54] IMPINGEMENT FREEZER

[75] Inventors: Gregory L. Ochs, Kirkland; James E. Aikins, Renton, both of Wash.

[73] Assignee: York Food Systems, Issaquah, Wash.

[21] Appl. No.: 385,633

[22] Filed: Feb. 8, 1995

[51] Int. Cl.$^6$ .................................................. F25D 25/02
[52] U.S. Cl. .................................. 62/380; 62/381; 62/404
[58] Field of Search .......................... 62/380, 381, 404; 34/638, 639

[56] References Cited

U.S. PATENT DOCUMENTS

| | | | |
|---|---|---|---|
| 2,907,118 | 10/1959 | Maescher | 34/639 |
| 3,199,224 | 8/1965 | Brown | 34/156 |
| 3,884,213 | 5/1975 | Smith | 126/21 A |
| 3,908,533 | 9/1975 | Fagerstrom et al. | 99/386 |
| 4,154,861 | 5/1979 | Smith | 426/466 |
| 4,289,792 | 9/1981 | Smith | 426/241 |
| 4,338,911 | 7/1982 | Smith | 126/21 A |
| 4,409,453 | 10/1983 | Smith | 219/10.55 A |
| 4,462,383 | 7/1984 | Henke et al. | 126/21 A |
| 4,479,776 | 10/1984 | Smith | 432/144 |
| 4,523,391 | 6/1985 | Smith et al. | 34/225 |
| 4,556,043 | 12/1985 | Bratton | 126/21 A |
| 4,626,661 | 12/1986 | Henke | 219/400 |
| 4,679,542 | 7/1987 | Smith et al. | 126/21 A |
| 4,831,238 | 5/1989 | Smith et al. | 219/400 |
| 4,834,063 | 5/1989 | Hwang et al. | 126/21 A |
| 4,873,107 | 10/1989 | Archer | 426/520 |
| 4,965,435 | 10/1990 | Smith et al. | 219/388 |
| 5,131,841 | 7/1992 | Smith et al. | 432/59 |
| 5,203,820 | 4/1993 | Dibbs | 62/381 |
| 5,222,309 | 6/1993 | Ross | 34/155 |
| 5,343,714 | 9/1994 | Kiczek | 62/380 X |

*Primary Examiner*—Christopher Kilner
*Attorney, Agent, or Firm*—Harry M. Cross, Jr.

[57] ABSTRACT

A tunnel freezing system employs multiple high velocity refrigerated air impingement jets to quick freeze food products such as hamburger patties and fish or chicken filets. Ultra high molecular weight polyethylene blocks are provided with a multiplicity of internal jet nozzles. These blocks are located in air ducts located above and below a conveyor belt so that the topsides and bottomsides of food products are impinged with the high velocity jets of refrigerated air so as to break up the boundary layer around the products to effect a much higher rate of heat transfer. A dual conveyor line employs direct drive centrifugal fans to deliver high pressure refrigerated air to the air ducts. The air ducts are spaced apart so that return air can freely return to be re-refrigerated after impinging on the food products.

19 Claims, 6 Drawing Sheets

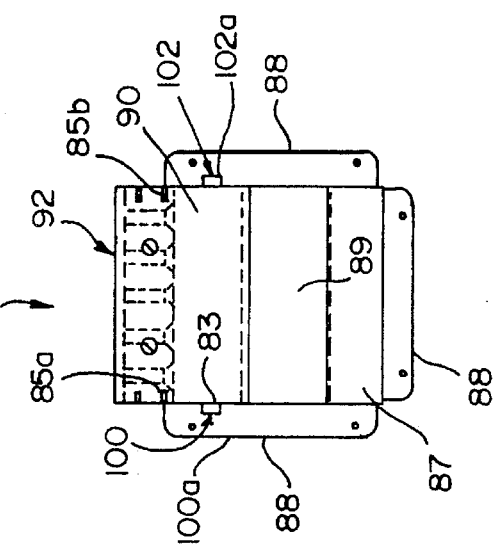
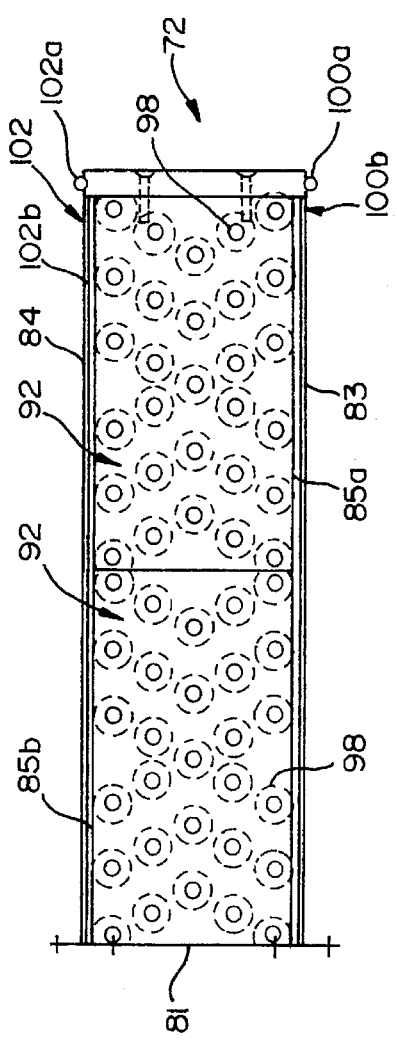
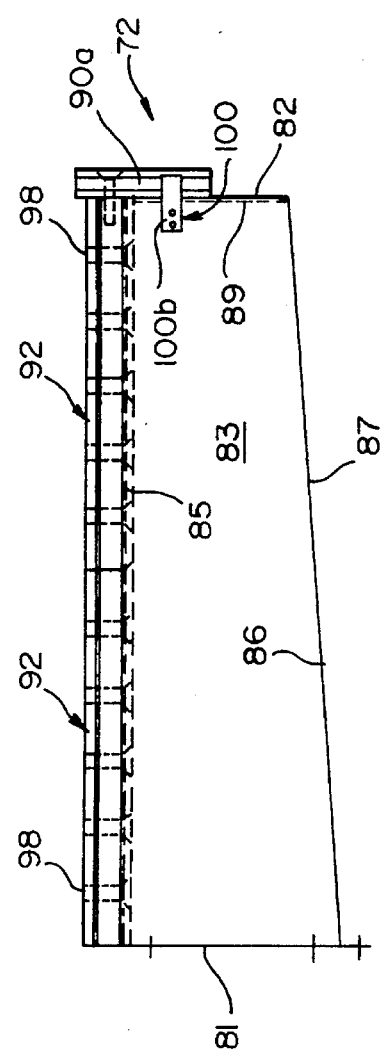

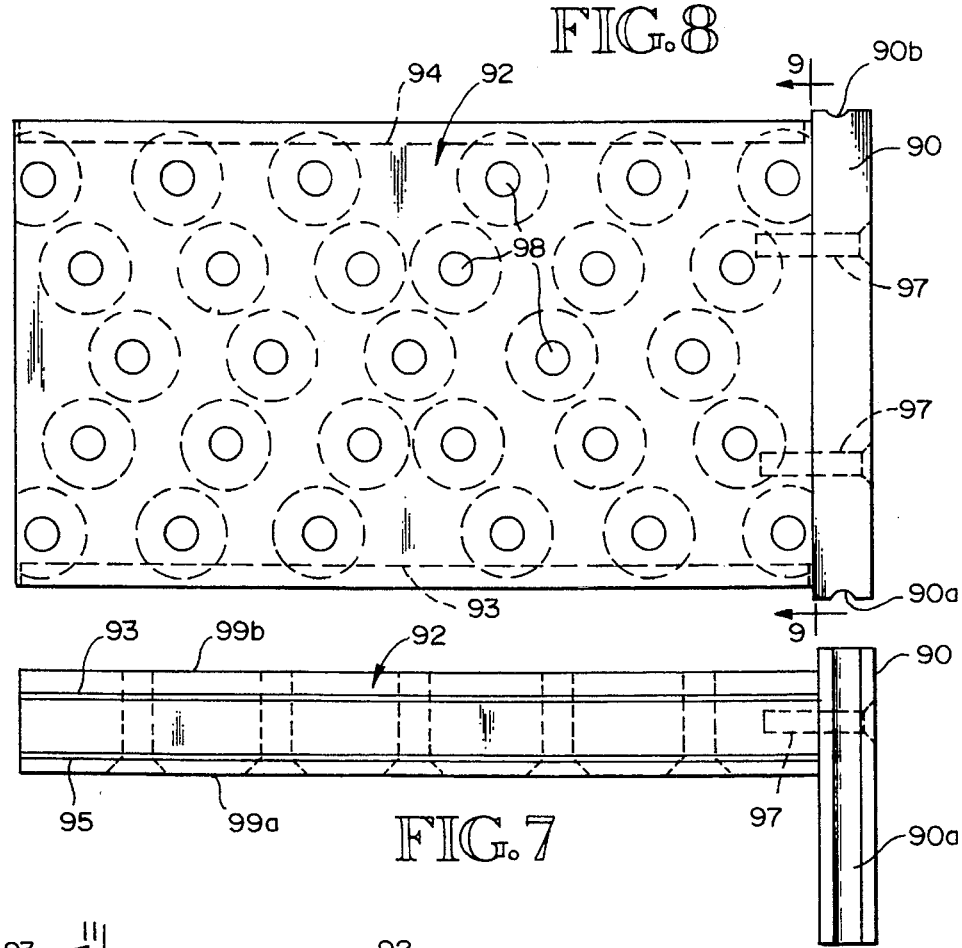
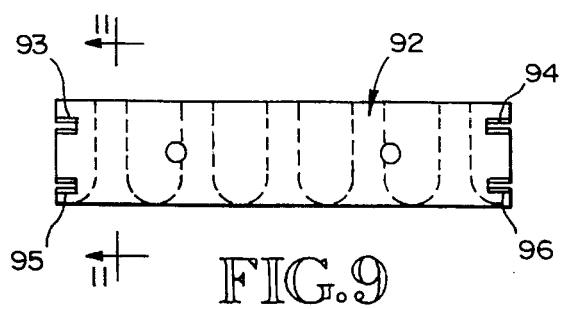
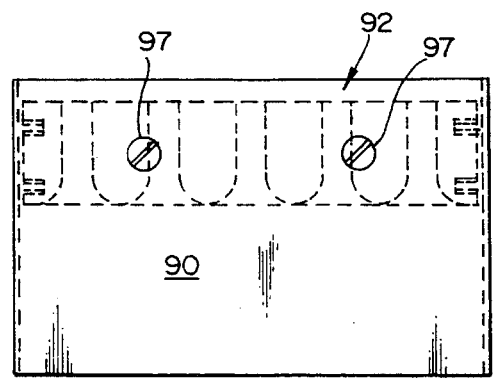

IMPINGEMENT FREEZER

BACKGROUND OF THE INVENTION

1. Field of the Invention

This invention relates to systems for freezing food and, more particularly, to such systems employing refrigerated air to fast freeze foodstuffs such as hamburger patties and fish fillets.

2. Brief Description of the Prior Art

There are generally two preferred means of quickly freezing thin, flat food products like hamburger patties and fish fillets to minimize dehydration weight losses: cryogenic freezing in a straight-belt freezer or mechanical freezing in a spiral freezer. Cryogenic freezing has the advantage of very fast, low temperature freezing for minimal yield losses: typically 0.5% for raw hamburger patties); but the disadvantage of high operating costs through the use of expendable gases. Mechanical freezing uses cold air as the heat transfer mechanism for lower operating costs but sometimes at a slightly higher rate of dehydration, depending on product characteristics. Though modern mechanical freezing systems with advanced airflow design provide good freezing, they have not always completely bridged the gap that favors cryogenic freezing for minimizing dehydration losses.

SUMMARY OF THE INVENTION

The present invention provides a system for quickly freezing thin food products such as hamburger patties and fish fillets by means of impingement freezing. The system of this invention provides an impingement freezing tunnel as an alternative to traditional freezing systems. On a raw hamburger patty, freezing time is reduced from about 13 minutes using conventional mechanical freezing techniques to about 2–3 minutes using the system of this invention. A primary object of the present invention is to achieve cryogenic-like freezing using mechanical refrigeration for a fraction of the operating cost. Another object of the present invention is to reduce dehydration (yield loss) to at or below the level of liquid nitrogen cryogenic freezers. A further object of the present invention is to produce quality comparable to that of cryogenic freezing because the size of ice crystals within the product is minimized. Still another object of the system of the present invention is to allow a straight line layout to easily replace existing nitrogen cryogenic freezing tunnels.

In accordance with these objectives, the present invention provides an enclosure means containing mechanical refrigeration means, conveyor means, and refrigerated air delivery means associated with the conveyor means. The conveyor means and associated air delivery means may be duplicated to provide dual impingement tunnel freezing lines served by a common mechanical refrigeration means. The conveyor means comprises an endless conveyor belt constructed to permit refrigerated air to contact both the topsides and bottomsides of food products carried by the conveyor belt. The refrigerated air delivery means comprises pluralities of duct means constructed and arranged to receive refrigerated air from the mechanical refrigeration means and to convert the stream of refrigerated air into a plurality of high velocity impingement jet streams directed to the topsides and bottomsides of food products carried by the conveyor belt. The duct means are separated from adjacent duct means so that air can be returned unimpeded to the refrigeration means after having contacted food products on the conveyor belt.

The duct means are provided with jet-forming means which provide a multiplicity of cylindrical jet passages having inlets opening to receive refrigerated air from the duct means, and having outlets opening toward the conveyor belt so that jets of refrigerated are directed toward the conveyor belt to impinge on the food products.

In summary, the invention provides a tunnel freezing system that employs multiple high velocity refrigerated air impingement jets to quick freeze food products such as hamburger patties and fish or chicken filets. Ultra high molecular weight polyethylene blocks are provided with a multiplicity of internal jet nozzles. These blocks are located in air ducts located above and below a conveyor belt so that the topsides and bottomsides of food products are impinged with the high velocity jets of refrigerated air so as to break up the boundary layer around the products to effect a much higher rate of heat transfer. A dual conveyor line employs direct drive centrifugal fans to deliver high pressure refrigerated air to the air ducts. The air ducts are spaced apart so that return air can freely return to be re-refrigerated after impinging on the food products.

BRIEF DESCRIPTION OF THE DRAWINGS

FIG. 4 is a side elevation of one of the air distribution modules of FIG. 3;

FIG. 5 is a top plan view of the FIG. 4 module;

FIG. 6 is an end view of the FIG. 4 module;

FIG. 7 is an enlarged detail in side elevation of a portion of the FIG. 4 module, illustrating one of the impingement jet-forming elements;

FIG. 8 is a top plan view of the FIG. 6 element;

FIG. 9 is an enlarged end view of the impingement jet-forming element of FIG. 7 taken along the line 9—9 in FIG. 7;

FIG. 10 is an end view of the FIG. 7 element;

FIG. 11 is an enlarged detail view of one of the impingement jet forming apertures taken along the line 11—11 of FIG. 9.

DESCRIPTION OF THE PREFERRED EMBODIMENT

Figure 1:
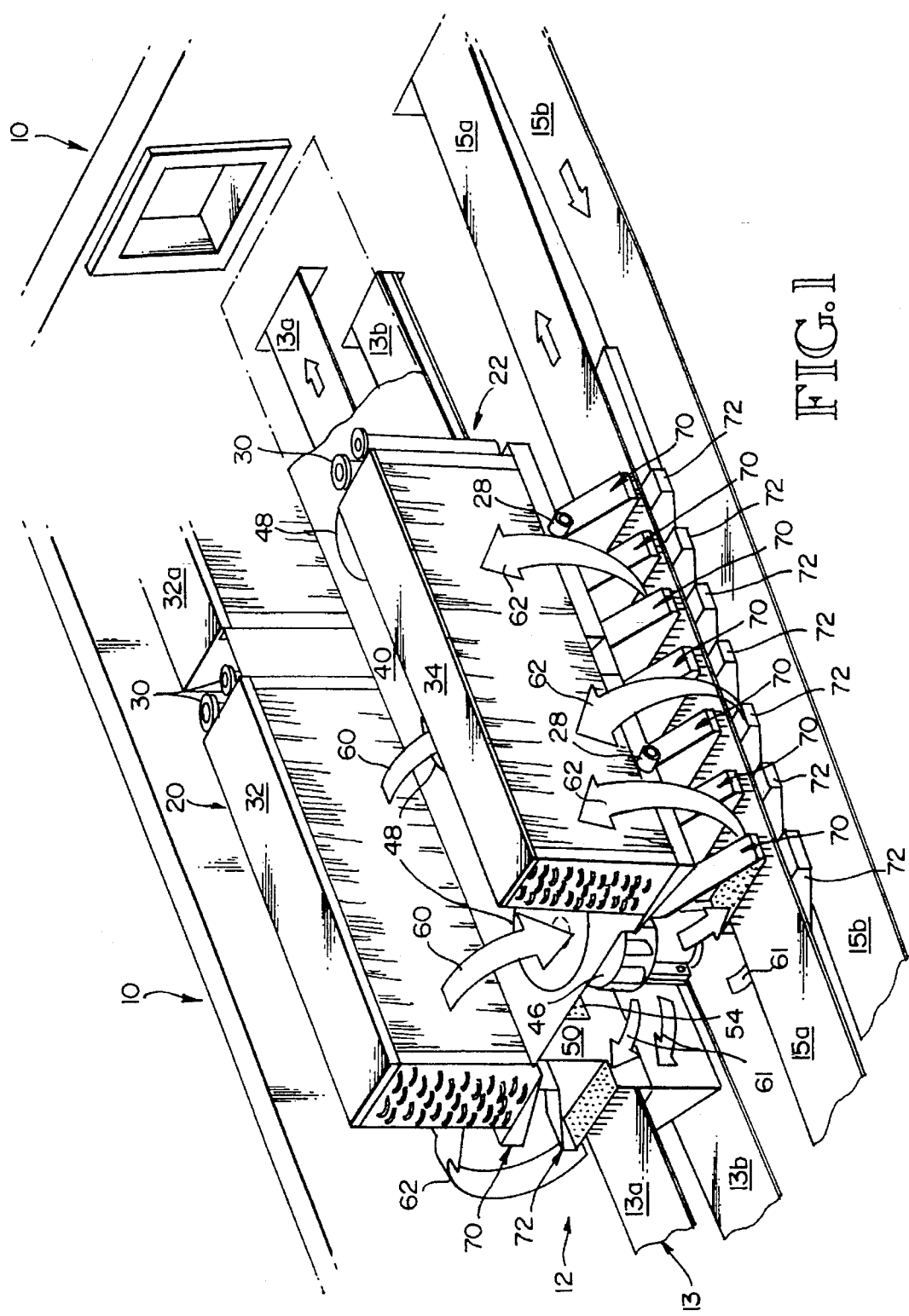
FIG. 1 is a perspective view of a twin-lane impingement freezing tunnel illustrating the operating principles of this invention.
Figure 2:
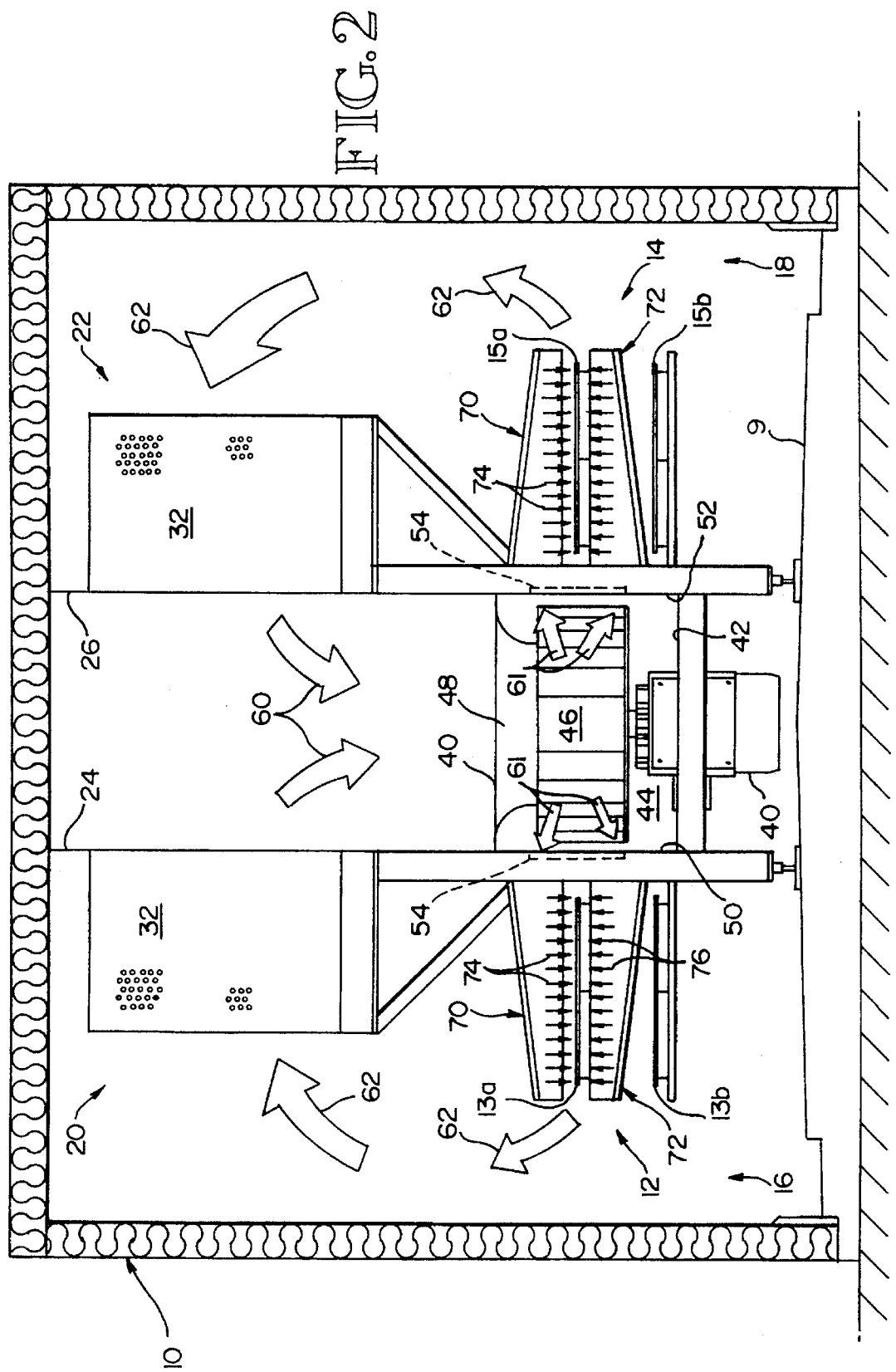
FIG. 2 is an interior end elevation view of the FIG. 1 system.

The system of the present invention is an impingement freezing tunnel system which may be single lane or a twin lane: FIGS. 1 and 2 illustrating a twin lane system. Air is refrigerated by means of a conventional refrigeration system, such as a conventional two-stage ammonia refrigeration system. The refrigerated air is directed to the top and bottom of a food product conveyor line or lines and converted into high velocity impingement jets. These refrigerated air impingement jets are directed to the tops and bottoms of food products as the products are conveyed through the system to accomplish impingement freezing of the food products.

Impingement freezing increases the rate of convection heat transfer from the surface of the food products to the cooling medium (air) by breaking apart or washing away the boundary layer of air on the product surface. The boundary layer is static and acts as an insulator to slow down the rate of heat transfer from the food product surface. By introducing multiple streams of refrigerated air at a high velocity relatively close to the surface of the food product, the boundary layer is pushed away. On a raw hamburger patty, for example where the freezing time in a conventional mechanical freezer might be about 13 minutes, impingement jet freezing can reduce the freezing time to about 2–3 minutes as a consequence of disrupting the boundary layer that coats the food product. As a result of the impingement jet freezing process of this invention, food products such as hamburger patties and fish fillets can be frozen as fast as by liquid nitrogen cryogenic freezing using mechanical refrigeration costing a fraction of the cost of cryogenic freezing. Moreover, in addition to the cost savings, dehydration (reflecting yield loss) is reduced, relative to customary mechanical refrigeration system, to at or below the level of liquid nitrogen cryogenic freezers. The present system produces a quality frozen food product or a quality comparable to that of liquid nitrogen cryogenic freezers because the impingement jet freezing minimizes the size of ice crystals that are formed within the food product. The overall configuration of the system of this invention closely matches that of a cryogenic, straight line freezer system; thereby permitting easy conversion and quick installation of the present system; rapid change-out of cryogenic freezers is facilitated. The present system has a modular design that permits quick installation and convenient future expansion by the addition of modules when needed.

The system of the present invention as illustrated in FIGS. 1 and 2 comprises an insulated housing 10 through which a pair of food product conveyor lines, 12 and 14, are extended. Food products, such as hamburger patties or fish fillets, are deposited on the conveyor belts 13, 15 and then conveyed through the housing 10 wherein they are frozen by impingement freezing. Housing 10 defines a tunnel, hence the term "tunnel freezing." Each conveyor line 12, 14, in addition to having conveyor belts 13, 15, is provided with appropriate drive and idler mechanisms that drive and support the conveyor belts. Each conveyor belt 13 or 15 is configured as an endless belt that extends from an outside inlet where food products are deposited on the top of the belt, through the housing 10 along a freezing course 13a, 15a, to an outside outlet where frozen food products are deposited from the belt, and back through the housing 10 along a return course 13b, 15b to the outside inlet. The conveyor lines 12, 14 are supported in a conventional manner that is not illustrated in the Figures. The conveyor courses 13a, 13b and 15a, 15b are located, one above the other as shown in FIG. 2, on either side of the housing interior. Each conveyor line 12, 14 is spaced inwardly of the housing 10 a sufficient distance to provide access passageways 16, 18 for maintenance and cleaning purposes. Overhead of each conveyor line, an evaporator assembly 20, 22 is mounted by a suitable framework 24, 26 for refrigerating air. The evaporators are cooled by an appropriate cooling fluid, such as ammonia, through appropriate inlet and outlet piping 28, 30, 32, 34. Each conveyor line evaporator assembly is provided in modules, one such module being completely shown in FIG. 1 for each conveyor line, and the end 32a of a second such module being shown with respect to conveyor line 12. The evaporator assembly modules are provided in parallel pairs, one of each pair for each side of the freezing system. Between the evaporator assemblies, a walkway 40 is provided that spans the distance across the evaporator pairs to provide access to the evaporators assemblies for maintenance and cleaning purposes. Below the walkway 40, a bottom floor 42 is provided at an elevation close to the floor 9 of the housing 10, the vertical distance between the walkway 40 and the floor 42 providing an air delivery plenum space 44. Within the plenum 44, centrifugal fans 46 are located to draw refrigerated air from the evaporator assemblies through fan inlet apertures 48. For each evaporator pair, two centrifugal fans are provided as shown in FIG. 1, with each fan being provided with a fan inlet aperture 48. Each fan 46 is driven by appropriate means, such as motor means 40 as illustrated in FIG. 1, that are appropriately mounted to drive the fans from below.

The plenum 44 is provided with side walls 50, 52 that extend from the walkway 46 to the floor 42. Each side wall 50, 52 is provided with a plurality of air discharge ports 54 for discharge of refrigerated air from the plenum into the conveyor lines 12, 14. The plenum is air tight, side walls 50, 52 and walkway 46 and floor 42 being joined in air-tight seams, so that refrigerated air from the evaporator assemblies (indicated by arrows 60) may be drawn into the centrifugal fans 46 through the fan inlet apertures 48 and then discharged from the fans and from the plenum through discharge ports 54 (indicated by arrows 61). When the refrigerated air has passed through the conveyor lines 12, 14, it is returned to the inlet side of the evaporator assemblies (indicated by arrows 62) for refrigeration. The centrifugal fans 46 provide the entire motive force for causing the air flow circulation thus described.

Refrigerated air is distributed to the freezing conveyor courses 13a 15a, from the discharge ports 54, by means of a plurality of air distribution assemblies. These air distribution assemblies are composed of a pair of upper and lower modules 70, 72, each module pair being served by an individual air discharge port 54. The module pairs are located above and below the conveyor freezing course 13a, 15a as shown in FIG. 2, the lower conveyor course 13b, 15b being located at a lower elevation sufficient for the lower modules 72 to fit.

In the preferred form of the system of this invention, the upper and lower air distribution modules 70, 72 are identical, with the attitudes of the modules oriented to oppose one another; that is, they are turned 180° relative to one another so that they are opposed. Each module 70, 72 is provided with impingement jet-forming means so that a plurality of high velocity impingement jets (illustrated in FIG. 2 by short, solid, vertical arrows 74, 76) of refrigerated air are discharged toward the top and bottom, respectively, of the conveyor course 13a, 15a. The impingement jets are preferably balanced, top and bottom, so that an upper jet 74 will be directly vertically inline with a lower jet 76. As a consequence of this inline relationship of the upper and lower jets, the air impingement forces on a thin food product, such as a hamburger patty, will be balanced top and bottom to keep the food product from being shifted or flipped.

The air distribution assemblies, composed of upper and lower air distribution modules 70, 72, are spaced along the conveyor lines 12, 14 at intervals so that there are lateral spaces between each such assembly. This is illustrated in FIG. 1 with respect to the conveyor line 14 and upper and lower modules 70, 72. The spacing between adjacent modules 70, 70 (and 72, 72) is generally about equal to the width of each module. This spacing provide channels between the air distribution assemblies for air to escape into the passageways 16, 18 after having been discharged through the impingement jets 74, 76 against the conveyor course 13*a*, 15*a*. If spacing between the modules were not provided, the velocity of the impingement jets could be reduced due to air pressure buildup on the conveyor course 13*a*, 15*a*, thereby impairing the breakup of the boundary layers of static air around the food products to be frozen. Furthermore, by spacing the air distribution modules apart, an air escape path between the adjacent modules is provided so that escaping air will not be washed across an adjacent stream of impingement jets as the spent air flows back to the evaporator assemblies (as represented by arrows 62). To enhance this escapement feature, the impingement jets may be located, relative to adjacent jets, so that each jet stream may be provided with its own individual escape path to the space between modules and then returned along paths 62 to the evaporator assemblies.

Now with reference to FIGS. 3–11, details of the preferred air distribution assemblies, each of which comprises an upper and a lower air distribution module 70, 72, are illustrated. FIGS. 4–11 illustrate the lower such module 72, but, as explained previously, modules 70 and 72 are preferably identical, except for their attitudes. Still more particularly, FIGS. 4–11 illustrate a lower module 72 as it would appear associated with conveyor line 14.

Each module (70 or 72) comprises an air duct 80 provided as a sheet metal form that is mounted to a side wall of the air delivery plenum 44 in fluid communication with an air discharge port 54. The air duct 80 has a tapered profile that is higher at its inner end 81 and lower at its outer end 82 and its side walls 83, 84 are provided as trapezoids having a horizontal edge 85 and a sloped edge 86. The horizontal edge 85 is disposed adjacent to and parallel with the conveyor course 13*a*, 15*a*. The sloped edge 86 extends outward at an acute angle with respect to edge 85 from the inner edge 81 to the outer end 82. An outer wall 87 covers extends between the side walls 83, 84 at their sloped outer edges 86. Walls 83, 84 and 87 may be conveniently fabricated from a single piece of sheet metal. As a result of this tapered profile, air duct 80 is suited to accommodate a diminishing volume of refrigerated air along its longitudinal length from inner end 81 to outer end 82. The inner end 81 is open and provided with side and bottom mounting flanges 88 for attachment to a side wall of plenum 44 in fluid communication with a port 54. The outer end 82 is closed by a partial wall 89, that is integral with walls 83, 84 and 87, and by a removable air seal 90.

The horizontal side of the module is covered by impingement jet-forming means in the form of one or more nozzle blocks 92; two such blocks being shown in FIGS. 4 and 5. The nozzle blocks 92 are supported or carried by the side walls 83, 84 of air duct 80 with the two blocks being in abutment endwise with one another as shown. The horizontal edges 85 of each side wall 83, 84 are formed to provide narrow, elongated perpendicular rims 85*a*, 85*b* that extend toward one another. Corresponding grooves 93, 94 are provided in the side edges of the blocks 92 so that the blocks may be slid along the rims to support the blocks from the air duct 80. In the preferred form of the nozzle blocks 92, each side edge is provided with another groove 95, 96, parallel to the adjacent groove 93, 94 so that the blocks can be mounted at two different elevations relative to the conveyor course 13*a*, 15*a*. The outer end of the outermost block is attached to the air seal 90 by suitable means such as screws 97 that are threaded into mating holes machined into the block end.

Figure 3:
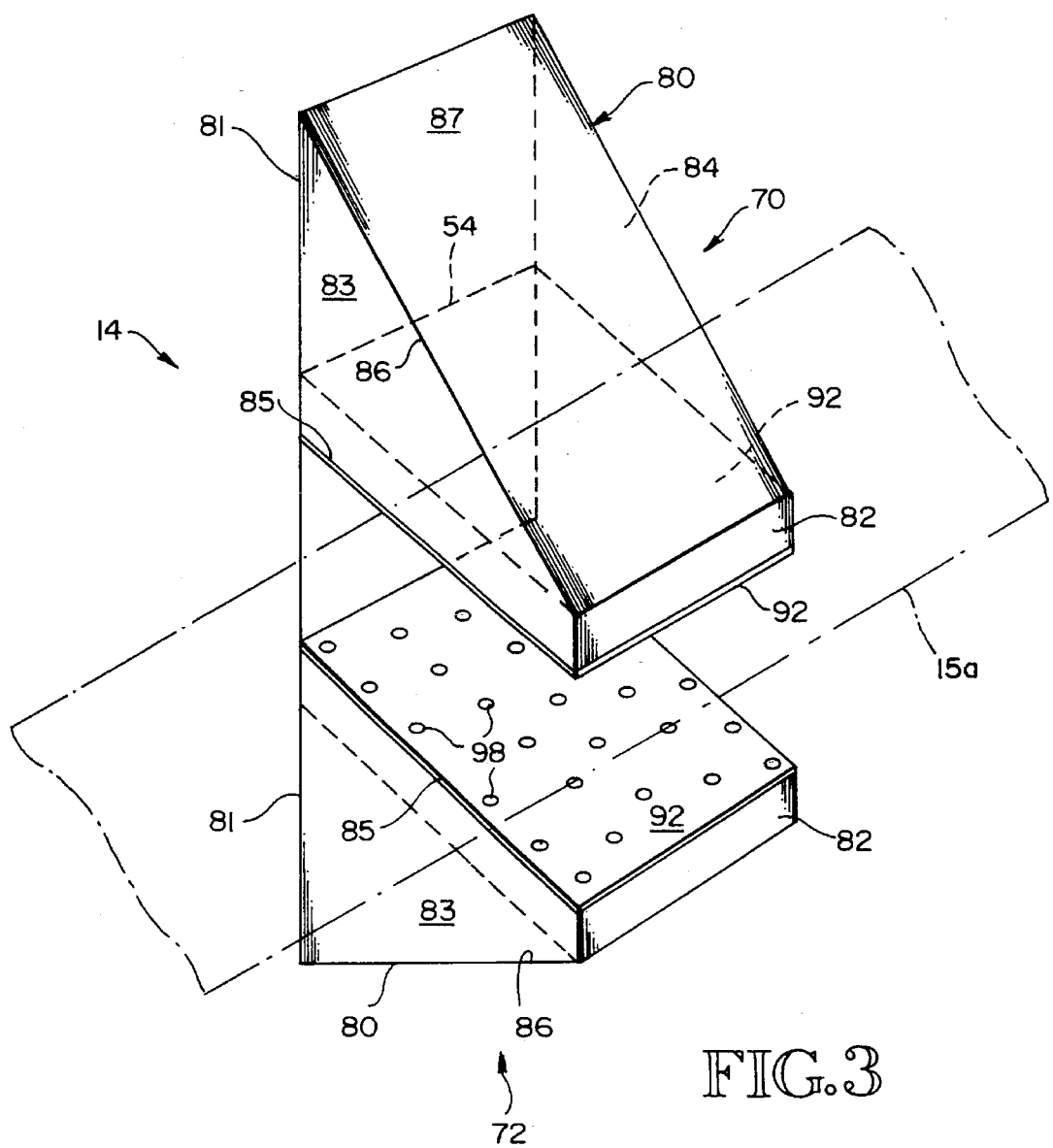
FIG. 3 is a perspective view of a portion of the FIG. 1 system illustrating a refrigerated air distribution assembly that directs refrigerated air jets onto the surface of a food product to accomplish impingement freezing.

FIG. 3 illustrates the nozzle blocks supported by rims 85*a*, 85*b* extended in the outer set of grooves 95, 96; and FIGS. 4–6 illustrate the nozzle blocks supported by rims 85*a*, 85*b* extended in the inner set of grooves 95, 96.

Each nozzle block 92 is provided with a plurality of jet-forming passages 98 extending vertically through the block from inner face 99*a* to the outer face 99*b* (see FIG. 7); inner face 99*a* facing into the air duct 80 and outer face 99*b* facing the conveyor course 13*a*, 15*a*. The passages 98 at the inner face 99*a* are formed with convex inlets 98*a* as shown in FIG. 11 to reduce turbulence and pressure drop of the refrigerated air as the air is discharged from the air ducts 80 out through the jet-forming passages 98.

The nozzle blocks 92 are preferably formed of a solid plastic material, such as ultra high molecular weight (UHMW) polyethylene and the grooves 93–96 and passages 98 are machined into the blocks. Because UHMW polyethylene is heavy, two nozzle blocks 92 are preferred for each module 70, 72 and installed in the air ducts 80 abutting one another as shown. Because the blocks 92 are solid, one piece elements, they are easily cleaned by being slid out from the air ducts 80 and pressure washed with an appropriate cleansing solution. Because the jet-forming passages 98 are integral with the blocks, there are no nooks or crannies within which bacteria could be harbored.

In order to facilitate insertion and removal of the nozzle blocks 92, air seal fasteners 100, 102 are attached to the air duct side walls 83 and designed to engage the side edges of the air seal 90 and hold the air seal into position against the end of the air duct. The side edges of the air seal 90 are machined to provide vertical semicylindrical grooves 90*a*, 90*b* within which vertical fastening cylindrical rods 100*a*, 102*a* ride to hold the air seal 90 in place. Rods 100*a*, 102*a* are mounted on leaf metal brackets 100*b*, 102*b*. Brackets 100*b*, 102*b* are riveted to the duct side walls 83 to hold rods 100*a*, 102*a* in their proper position for engagement with the air seal grooves 90*a*, 90*b*. As a result of this configuration for the air seal fasteners 100, 102, the air seal may be removed by first removing screws 97 and then sliding the air seal upward or downward along the end of the air duct 80 until the rods 100*a*, 102*a* are removed from engagement with the grooves 90*a*, 90*b*. Thus exposed, the nozzle blocks 92 may then be removed. To install an air seal 90, the air seal would be aligned with the rods 100*a*, 102*a*, either above or below the rods, and then slid to engage the rods into the grooves and to align the screw hole in the air seal with the screw holes in the end of the adjacent block 92; and then the screws 97 can be inserted to fasten the air seal 90 into its installed position.

FIGS. 5 and 8 illustrate a preferred pattern for locating the passages 98. The staggered arrangement of these passages 98 locates each passage so that the air jet passing through the passage can escape transversely to the side without interfering with the adjacent air jets. The jets are symmetrically arranged with respect to the longitudinal and transverse axes of the blocks 92. Consequently any block 92 can be installed in any module 70, 72 regardless of whether of the module positions the block to discharge air jets downward (as per modules 70) or upward (as per modules 72); and any block 92 can be turned end-for-end without altering the air jet pattern of the module. Therefore, a thin, flat food product, such as a hamburger patty or a fish fillet, will be contacted by vertically opposing air jets, no matter how any particular block is installed and, therefore, will be stabilized by the opposing air streams against being shifted around the conveyor course 13*a*, 15*a* or flipped by unopposed air forces.

Figure 12:
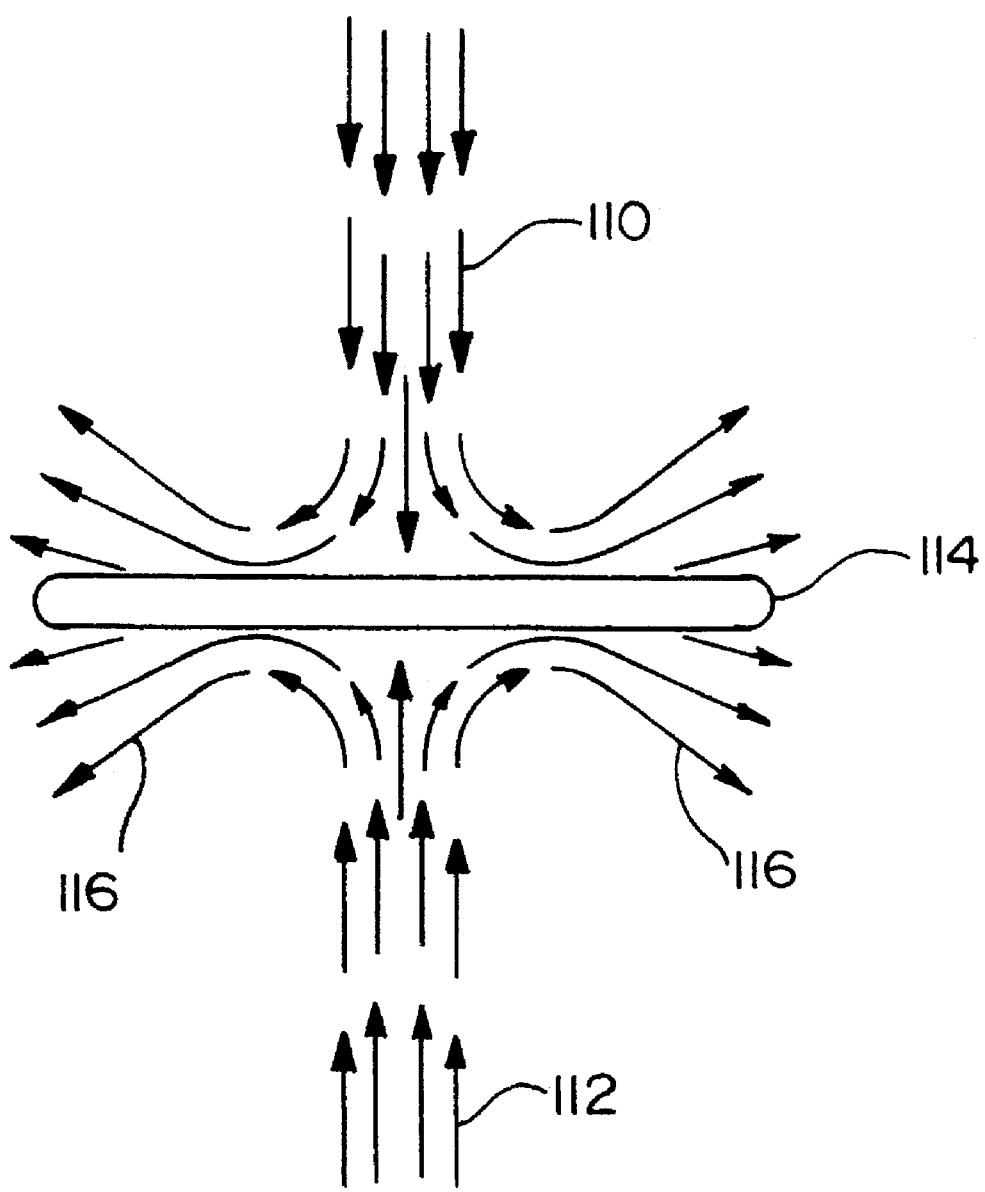
FIG. 12 is a vertical illustration of the impingement of vertically-aligned air jets on a thin food product such as a hamburger patty or a fish fillet.

FIG. 12 illustrates this balanced opposing jet configuration whereby upper and lower refrigerated air jets 110, 112 are vertically aligned so as to apply balanced forces on opposite sides of a patty or fillet 114. These high velocity air jets will break away the static boundary layer of air that encompasses the patty or fillet for rapid heat transfer and freezing. When the jets have contacted the patty or fillet, the jet streams then deflect sideways, as at 115, and seek out paths of least resistance for return to the evaporator assemblies. Because of the staggered pattern of the jet-forming passages 98, these paths of least resistance will extend between the adjacent jets and, therefore, the spent, returning air will not interfere with the boundary layer-interrupting capacity of adjacent air jets.

The length of the freezer described herein may be made up of modules; typically fifteen foot modules. The length of the freezer and consequently the capacity would be a function of its length. The conveyor belt may be conveniently 27 inches wide with a net useable width of 26 inches. In a complete freezing system, typically the conveyor belt would travel through a belt washer station at the infeed, then the belt would enter the freezer tunnel, passing through the high velocity impingement jet streams. The belt would then exit the enclosure and travel around a drive shaft and then return back to the infeed. The belt would be supported on straight fixed rails throughout its travel. These rails would be located at the very edge of the belt to eliminate air obstructions in the impingement zone. The rails would be covered with a low friction replaceable wear strip material.

Where the system would be provided in modules, such as fifteen foot modules, high velocity refrigerated air would be supplied by two centrifugal fans per module. These fans would be direct driven and arranged to discharge into air ducts that are located above and below the conveyor belt. The air ducts are preferably sheet metal forms with tapered profiles. This construction design helps distribute the flow of air evenly along the entire length of the duct. The air ducts would be arranged in a spaced orientation; the gap between adjacent ducts allowing return air to easily and freely escape from the impingement area.

After entering the ducts, air is directed through a series of nozzles which focus the air stream into multiple air jets. The nozzles are formed from solid blocks of ultra high molecular weight polyethylene plastic. The blocks are removable for cleaning or can be replaced with similar blocks having different hole patterns. The holes in the blocks have tapered inlets which help reduce the pressure drop through the block. The holes are also arranged in a symmetrical pattern so that a top block can be flipped over and used as a bottom block. This block nozzle design insures top and bottom hole alignment. The blocks can be positioned in the air ducts at different elevations to allow for flexibility for a variety of product heights.

The conveyor belt would preferable be made from stainless steel and is designed to have only one layer of wire mesh. This single layer of mesh prevents the air from being disturbed as it is blown from the underside. The conveyor discharge end would be equipped with a scraper blade to peel the frozen product from the belt. This scraper would be spring loaded and could be positioned close to the belt.

The system of this invention could be operated from a main control panel located next to the enclosure. An operator interface screen would display operating and fault conditions along with providing the control for all the machine functions. Conveyor start/stop, fans on/off and belt washer operations would be controlled from this single control screen.

The velocity through the nozzle blocks is preferably in the range of 6500 to 7500 feet per minute at the product surface.

This high velocity is the key to impingement freezing. The surface of the product is effectively protected by an insulating air film or boundary layer. Concentrated streams of high velocity air are able to pierce through this insulating layer resulting in a much higher rate of heat transfer. Freezing time can be reduced to one fifth of that of conventional spiral freezing systems. This freezing time afforded by the present invention is comparable with freezing times in cryogenic systems.

The system of this invention is primarily designed to freeze thin flat products with low heat removal requirements. Although freezing times are significantly reduced, cooked products or products with high heat removal requirements can require conveyor lengths which would be excessive for most plant facilities. Typical products may include hamburger patties and fish or chicken fillets.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. An impingement freezing system for fast freezing of food products which comprises:

i) enclosure means providing an elongated freezing zone having an inlet for food products to enter said zone and an outlet for food products to leave said zone, said enclosure means having a width, length and height sufficient to enable humans to physically enter therein to service the hereinafter-described means;

ii) mechanical refrigeration means located within said enclosure means and comprising low temperature evaporator means for cooling air contained within said enclosure to provide refrigerating air for freezing food products, and fan means for circulating refrigerated air into contact with food products so that food products may enter said zone in an unfrozen state and leave said freezing zone in a frozen state;

iii) conveyor means comprising endless conveyor belt means providing an open mesh conveyor belt for supporting and conveying food products through said freezing zone, and power means for causing said conveyor belt to travel continuously through said freezing zone;

iv) refrigerated air delivery means located in said enclosure means for receiving refrigerated air from said mechanical refrigeration means and delivering individual jets of refrigerated air to the topsides and undersides of food products conveyed through said enclosure means on said conveyor belt, said delivery means comprising:

a) first and second pluralities of duct means, the duct means of said first plurality of duct means being arranged in parallel with one another and positioned at intervals along and above said conveyor belt with each duct means having an inlet in air communication with said mechanical refrigeration means and an outlet oriented downward toward the topside of said conveyor belt; the duct means of said second plurality of duct means being arranged in parallel with one another and positioned at intervals along and below said conveyor belt with each duct means having an inlet in air communication with said mechanical refrigeration means and an outlet oriented upward toward the bottomside of said conveyor belt; each of the ducts means of said first and second pluralities of duct means being provided as air distribution modules that are spaced apart from the air distribution modules of adjacent duct means so that air return spaces are provided between the air distribution modules of adjacent duct means permitting air discharged from said duct means along air escape paths between adjacent air distribution modules to return unimpeded to said evaporator means after contacting food products on said conveyor belt;

b) and a plurality of refrigerated air jet-forming means, each jet-forming means comprising a solid block having a predetermined width, length and thickness defining spaced-apart inner and outer surfaces with each block having a multiplicity of cylindrical jet passages extending through the block with jet inlets opening at said inner surface and with jet outlets opening at said outer surface;

c) each duct means having at least one jet-forming means removably positioned in the duct means outlet so that refrigerated air entering the duct means through its inlet will contact the inner surface of the jet-forming means and pass through the jet passages, d) each jet-forming means being located in a duct means outlet so that the jet-forming means outer surface is parallel to said conveyor belt with its jet passage outlets in close proximity to said conveyor belt.

2. The system of claim 1 wherein said each jet-forming means block comprises a parallelepiped having a thickness substantially less than its width or its length, and having two side edges each provided with at least one groove extending parallel to its inner and outer surfaces; and wherein each of said duct means comprises a housing defining its inlet and outlet, said housing having two rims on opposite sides of said outlet oriented so that a jet-forming means block can be slid into and out of said outlet be slidingly engaging or disengaging, respectively, a pair of block side edge grooves with said housing rims.

3. The system of claim 1 wherein each of the multiplicity of cylindrical jet passages in each jet-forming means block is defined by an inlet opening having an annular convex inlet surface connecting its cylindrical passage, said annular convex inlet surface being contained within said block.

4. The system of claim 3 wherein the multiplicity of cylindrical jet passages in each jet-forming block is arranged across the inner and outer surfaces of said block to form a symmetrical pattern so that any one block can be positioned in any duct means regardless of whether a duct means is one of the first or second pluralities of duct means.

5. The system of claim 4 wherein said each jet-forming means block comprises a parallelepiped having a thickness substantially less than its width or its length, and having two side edges each provided with at least one groove extending parallel to its inner and outer surfaces; and wherein each of said duct means comprises a housing defining its inlet and outlet, said housing having two rims on opposite sides of said outlet oriented so that a jet-forming means block can be slid into and out of said outlet be slidingly engaging or disengaging, respectively, a pair of block side edge grooves with said housing rims.

6. An impingement freezing system for fast freezing of food products which comprises:

i) enclosure means providing an elongated freezing zone having an inlet for food products to enter said zone and an outlet for food products to leave said zone, said enclosure means having a width, length and height sufficient to enable humans to physically enter therein to service the hereinafter-described means;

ii) mechanical refrigeration means located within said enclosure means and comprising low temperature evaporator means for cooling air contained within said enclosure to provide refrigerating air for freezing food products, and fan means for circulating refrigerated air into contact with food products so that food products may enter said zone in an unfrozen state and leave said freezing zone in a frozen state;

iii) conveyor means comprising endless conveyor belt means providing an open mesh conveyor belt for supporting and conveying food products through said freezing zone, and power means for causing said conveyor belt to travel continuously through said freezing zone;

iv) refrigerated air delivery means located in said enclosure means for receiving refrigerated air from said mechanical refrigeration means and delivering individual jets of refrigerated air to the topsides and undersides of food products conveyed through said enclosure means on said conveyor belt, said delivery means comprising:

a) first and second pluralities of duct means, the duct means of said first plurality of duct means being arranged in parallel with one another and positioned along and above said conveyor belt with each duct means having an inlet in air communication with said mechanical refrigeration means and an outlet oriented downward toward the topside of said conveyor belt; the duct means of said second plurality of duct means being arranged in parallel with one another and positioned along and below said conveyor belt with each duct means having an inlet in air communication with said mechanical refrigeration means and an outlet oriented upward toward the bottomside of said conveyor belt; each of the ducts means of said first and second pluralities of duct means beings spaced apart from adjacent duct means so that air return spaces are provided between adjacent duct means permitting air discharged from said duct means to return unimpeded to said evaporator means after contacting food products on said conveyor belt;

b) and a plurality of refrigerated air jet-forming means, each jet-forming means comprising a solid block fabricated as a unitary body of ultra high molecular weight polyethylene plastic having a predetermined width, length and thickness defining spaced-apart inner and outer surfaces with each block having a multiplicity of cylindrical jet passages extending through the block with jet inlets opening at said inner surface and with jet outlets opening at said outer surface; each of the multiplicity of cylindrical jet passages in each jet-forming means block being defined by an inlet opening having an annular convex inlet surface connecting its cylindrical passage, said annular convex inlet surface being contained within said block; the multiplicity of cylindrical jet passages in each jet-forming block being arranged across the inner and outer surfaces of said block to form a symmetrical pattern so that and one block can be positioned in any duct means regardless of whether a duct means is one of the first or second pluralities of duct means; each jet-forming means block comprising a parallelepiped having a thickness substantially less than its width or its length, and having two side edges each provided with at least one groove extending parallel to its inner and outer surfaces;

c) each duct means having at least one jet-forming means removably positioned in the duct means outlet so that refrigerated air entering the duct means through its inlet will contact the inner surface of the jet-forming means and pass through the jet passages, d) each jet-forming means being located in a duct means outlet so that the jet-forming means outer surface is parallel to said conveyor belt with its jet passage outlets in close proximity to said conveyor belt; and each of said duct means comprising a housing defining its inlet and outlet, said housing having two rims on opposite sides of said outlet oriented so that a jet-forming means block can be slid into and out of said outlet by slidingly engaging or disengaging, respectively, a pair of block side edge grooves with said housing rims.

7. An impingement freezing system for fast freezing of food products which comprises:

i) enclosure means providing a first elongated freezing zone having an inlet for food products to enter said zone and an outlet for food products to leave said zone, and a second elongated freezing zone having a second inlet for food products to enter said second zone and a second outlet for food products to leave said second zone, said enclosure means having a width, length and height sufficient to enable humans to physically enter therein to service the hereinafter-described means;

ii) mechanical refrigeration means located within said enclosure means and comprising low temperature evaporator means for cooling air contained within said enclosure to provide refrigerating air for freezing food products, and fan means for circulating refrigerated air into contact with food products so that food products max enter said zone in an unfrozen state and leave said freezing zone in a frozen state;

iii) first conveyor means comprising a first endless conveyor belt means providing a first open mesh conveyor belt for supporting and conveying food products through said freezing zone, and power means for causing said first conveyor belt to travel continuously through said freezing zone; second conveyor means comprising a second endless conveyor belt means providing a second open mesh conveyor belt for supporting and conveying food products through said freezing zone, and power means for causing said second conveyor belt to travel continuously through said freezing zone; said second endless conveyor belt means being oriented parallel to said first endless conveyor belt means;

iv) first refrigerated air delivery means located in said enclosure means for receiving refrigerated air from said mechanical refrigeration means and delivering individual jets of refrigerated air to the topsides and undersides of food products conveyed through said enclosure means on said first conveyor belt, said delivery means comprising:

a) first and second pluralities of duct means, the duct means of said first plurality of duct means being arranged in parallel with one another and positioned along and above said first conveyor belt with each duct means having an inlet in air communication with said mechanical refrigeration means and an outlet oriented downward toward the topside of said first conveyor belt; the duct means of said second plurality of duct means being arranged in parallel with one another and positioned along and below said first conveyor belt with each duct means having an inlet in air communication with said mechanical refrigeration means and an outlet oriented upward toward the bottomside of said first conveyor belt; each of the ducts means of said first and second pluralities of duct means being spaced apart from adjacent duct means so that air return spaces are provided between adjacent duct means permitting air discharged from said duct means to return unimpeded to said evaporator means after contacting food products on said first conveyor belt;

b) and a plurality of refrigerated air jet-forming means, each jet-forming means comprising a solid block having a predetermined width, length and thickness defining spaced-apart inner an outer surfaces with each block having a multiplicity of cylindrical jet passages extending through the block with jet inlets opening at said inner surface and with jet outlets opening at said outer surface;

c) each duct means having at least one jet-forming means removably positioned in the duct means outlet so that refrigerated air entering the duct means through its inlet will contact the inner surface of the jet-forming means and pass through the jet passages, d) each jet-forming means being located in a duct means outlet so that the jet-forming means outer surface is parallel to said first conveyor belt with its jet passage outlets in close proximity to said conveyor belt;

v) second refrigerated air delivery means located in said enclosure means for receiving refrigerated air from said mechanical refrigeration means and delivering individual jets of refrigerated air to the topsides and undersides of food products conveyed through said enclosure means on said second conveyor belt, said second delivery means comprising:

a) third and fourth pluralities of duct means, the duct means of said third plurality of duct means being arranged in parallel with one another and positioned along and above said second conveyor belt with each duct means having an inlet in air communication with said mechanical refrigeration means and an outlet oriented downward toward the topside of said second conveyor belt; the duct means of said fourth plurality of duct means being arranged in parallel with one another and positioned along and below said second conveyor belt with each duct means having an inlet in air communication with said mechanical refrigeration means and an outlet oriented upward toward the bottomside of said second conveyor belt; each of the ducts means of said third and fourth pluralities of duct means being spaced apart from adjacent duct means so that air return spaces are provided between adjacent duct means permitting air discharged from said duct means to return unimpeded to said evaporator means after contacting food products on said second conveyor belt;

b) and a plurality of refrigerated air jet-forming means, each jet-forming means comprising a solid block having a predetermined width, length and thickness defining spaced-apart inner and outer surfaces with each block having a multiplicity of cylindrical jet passages extending through the block with jet inlets opening at said inner surface and with jet outlets opening at said outer surface;

c) each duct means having at least one jet-forming means removably positioned in the duct means outlet so that refrigerated air entering the duct means through its inlet will contact the inner surface of the jet-forming means and pass through the jet passages, d) each jet-forming means being located in a duct means outlet so that the jet-forming means outer surface is parallel to said conveyor belt with its jet passage outlets in close proximity to said second conveyor belt;

said first conveyor belt and said second conveyor belt being located in said enclosure means on opposite sides of said fan means so that two food product freezing lines are provided that are served by refrigerated air delivered by said fan means; said first and second pluralities of duct means and said third and fourth pluralities of duct means being arranged so that said first and third pluralities of duct means being located opposite to one another on opposite sides of said fan means with their respective inlets opening toward one another; said second and fourth pluralities of duct means being located opposite to one another on opposite sides of said fan means with their respective inlets opening toward one another; said mechanical refrigeration means being constructed to provide an elongated refrigerated air plenum chamber extending lengthwise between said first-mentioned conveyor belt and said second conveyor belt and providing for refrigerated air communication between said fan means and the inlets of all of said duct means.

8. The system of claim 7 wherein said fan means comprises a plurality of centrifugal fans located between said first-mentioned conveyor belt and said second conveyor belt and oriented for rotation about vertical axes; each centrifugal fan having an inlet in fluid communication with said evaporator for receiving refrigerated air from said evaporator means; each centrifugal fan having an outlet located in said plenum chamber in fluid communication with the inlets of all of said duct means.

9. The system of claim 8 wherein said each jet-forming means block comprises a parallelepiped having a thickness substantially less than its width or its length, and having two side edges each provided with at least one groove extending parallel to its inner and outer surfaces; and wherein each of said duct means comprises a housing defining its inlet and outlet, said housing having two rims on opposite sides of said outlet oriented so that a jet-forming means block can be slid into and out of said outlet be slidingly engaging or disengaging, respectively, a pair of block side edge grooves with said housing rims.

10. The system of claim 8 wherein each of the multiplicity of cylindrical jet passages in each jet-forming means block is defined by an inlet opening having an annular convex inlet surface connecting its cylindrical passage, said annular convex inlet surface being contained within said block.

11. The system of claim 10 wherein the multiplicity of cylindrical jet passages in each jet-forming block is arranged across the inner and outer surfaces of said block to form a symmetrical pattern so that any one block can be positioned in any duct means regardless of whether a duct means is one of the first or second pluralities of duct means.

12. The system of claim 11 wherein said each jet-forming means block comprises a parallelepiped having a thickness substantially less than its width or its length, and having two side edges each provided with at least one groove extending parallel to its inner and outer surfaces; and wherein each of said duct means comprises a housing defining its inlet and outlet, said housing having two rims on opposite sides of said outlet oriented so that a jet-forming means block can be slid into and out of said outlet be slidingly engaging or disengaging, respectively, a pair of block side edge grooves with said housing rims.

13. The system of claim 12 wherein each jet-forming means block is fabricated as a unitary body of ultra high molecular weight polyethylene plastic.

14. A refrigerated air jet-forming means for use in an impingement freezing system to convert a stream of pressurized refrigerated air into a plurality of high velocity impingement jet streams which comprises a solid block having a predetermined width, length and thickness defining spaced-apart inner and outer surfaces with each block having a multiplicity of cylindrical jet passages extending through the block with jet inlets opening at said inner surface and with jet outlets opening at said outer surface; the multiplicity of cylindrical jet passages in said jet-forming block being arranged across the inner and outer surfaces of said block to form a symmetrical pattern so that said can be interchangeably positioned to direct refrigerated air jets upwardly or downwardly; and said jet passages being further arranged with respect to adjacent jet passages that jet streams issuing from the jet passages are provided with direct paths across said outer surface without intersecting any other jet stream.

15. The system of claim 14 wherein said jet-forming means block comprises a parallelepiped having a thickness substantially less than its width or its length, and having two side edges each provided with at least one groove extending parallel to its inner and outer surfaces for sliding engagement with a source of refrigerated air.

16. The system of claim 14 wherein each of the multiplicity of cylindrical jet passages in said jet-forming means block is defined by an inlet opening having an annular convex inlet surface connecting its cylindrical passage, said annular convex inlet surface being contained within said block.

17. The system of claim 16 wherein the multiplicity of cylindrical jet passages in said jet-forming block is arranged across the inner and outer surfaces of said block to form a symmetrical pattern so that said can be interchangeably positioned to direct refrigerated air jets upwardly or downwardly.

18. The system of claim 17 wherein said jet-forming means block comprises a parallelepiped having a thickness substantially less than its width or its length, and having two side edges each provided with at least one groove extending parallel to its inner and outer surfaces for sliding engagement with a source of refrigerated air.

19. A refrigerated air jet-forming means for use in an impingement freezing system to convert a stream of pressurized refrigerated air into a plurality of high velocity impingement jet streams which comprises a solid block fabricated as a unitary body of ultra high molecular weight polyethylene plastic having a predetermined width, length and thickness defining spaced-apart inner and outer surfaces with said block having a multiplicity of cylindrical jet passages extending through the block with jet inlets opening at said inner surface and with jet outlets opening at said outer surface; each of the multiplicity of cylindrical jet passages in said block being defined by an inlet opening having an annular convex inlet surface connecting its cylindrical passage, said annular convex inlet surface being contained within said block; and the multiplicity of cylindrical jet passages in said block being arranged across the inner and outer surfaces of said block to form a symmetrical pattern so that said can be interchangeably positioned to direct refrigerated air jets upwardly or downwardly; said block comprising a parallelepiped having a thickness substantially less than its width or its length, and having two side edges each provided with at least one groove extending parallel to its inner and outer surfaces.

* * * * *